Sept. 29, 1959      J. M. McCANN      2,906,108
SILO UNLOADER COUPLING ASSEMBLY
Filed Aug. 19, 1957
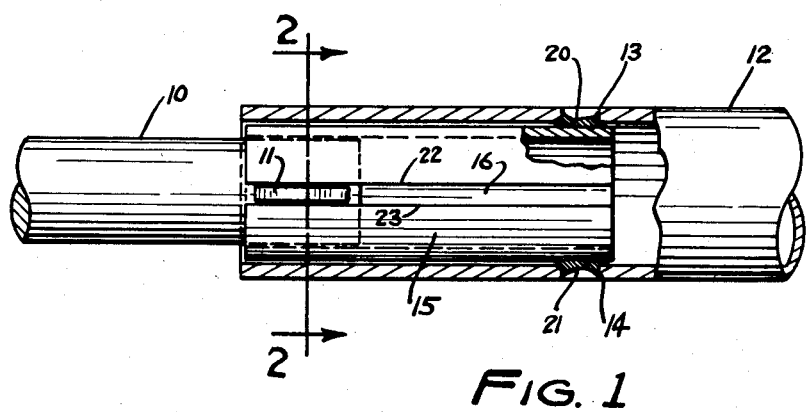
FIG. 1
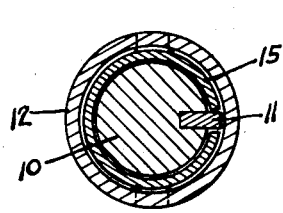      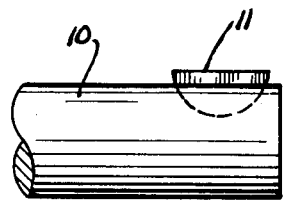
FIG. 2      FIG. 3
INVENTOR
JOHN M. McCANN
ATTORNEYS United States Patent Office 2,906,108
Patented Sept. 29, 1959

2,906,108

SILO UNLOADER COUPLING ASSEMBLY

John M. McCann, Long Lake, Minn., assignor to Vandale Corporation, Long Lake, Minn., a corporation of Minnesota Application August 19, 1957, Serial No. 679,032

5 Claims. (Cl. 64—27)

In the driving of helical flight gathering means for silo unloaders of the type shown in Patents 2,719,058 and 2,794,560, there has risen the problem of absorbing initial starting torque or shock.

In the silo unloaders of the foregoing patents, ensilage is removed from the top surface of a stored mass by such a helical flight, and conveyed by said flight for exhaustion from the silo. The helical flight conveyor or conveyors rest upon the surface of the ensilage, and when not in use or operation will settle to some extent, due to the weight of the unloader. Additionally, where the silo unloader is being used in conditions of freezing temperatures, the periphery of the helical flight itself will many times become frozen to the top surface of the ensilage, and even if it does not become so frozen, the conveying force necessary to convey the frozen ensilage, particularly upon starting, is tremendous.

It is therefore an object of this invention to provide a new and useful coupling assembly or shock absorbing drive connection to transfer torque from a drive shaft to a driven shaft so that at least a portion of the initial starting torque is absorbed to such an extent that fatigue is eliminated or materially reduced, as well as breakage of initial shock.

A further object of this invention is to provide a flexible coupling unit of improved construction adapted to drivingly connect a drive member and a driven member, as a drive shaft for a helical conveying flight of a silo unloader and the driven flight shaft itself.

Another object of the present invention is to provide a flexible coupling unit which is simple in construction, efficient in operation and inexpensive to manufacture and assemble.

Still a further object of this invention is to provide an improved coupling arrangement providing limited arcuate movement between two shafts.

Still a further object of this invention is to provide a resilient, shock absorbing connection between a drive shaft and a concentric driven shaft.

A still further object of this invention resides in the provision of a drive shaft having an extending lug means which may be releasably engaged with a driven shaft, said driven shaft having a concentric shock absorbing member connected to it and to said drive shaft in spaced relation.

Other and further objects of this invention reside in the specific constructional details of the drive shaft, the driven shaft, the connecting member and the cooperation thereof.

Still other and further objects of the invention are those inherent and apparent in the structure as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

Throughout the description of this invention, reference will be made to the three figures of the drawings in which corresponding numerals refer to the same parts and in which:

Figure 1 is an elevational view of the instant invention, partially broken away, to illustrate the details thereof;

Figure 2 is a vertical sectional view taken along the line and in the direction of the arrows 2—2 of Figure 1; and Figure 3 is a view of the drive shaft of the instant invention rotated 90 degrees from the position of Figure 1.

In the drawings, the drive shaft 10 is provided with a suitable extending lug 11. In this instance the drive shaft 10 is a solid shaft and is provided with a keyway in which the lug 11, in the form of a semi-circular key, is press fitted. The driven shaft 12 is hollow and provided with a plurality of spaced apertures 13 and 14, in this instance being two in number and in opposed 180 degree relation. As shown the apertures are circular. A connecting member or sleeve 15 has an outside diameter slightly smaller than the inside diameter of member 12 and an inside diameter slightly larger than the outside diameter of member 10, so that the three members can be assembled as shown in the position of Figure 1. Sleeve 15 is provided with an axial separation or slot 16 extending the length or substantially the length thereof.

Sleeve 15 is secured in the position of Figure 1 by welds at 20 and 21 through apertures 13 and 14 to member 12 and is thus fixed in position with reference thereto.

In operation, as will be appreciated, the sleeve 15 serves not only as a shock absorbing member when initial rotary motion is supplied through the turning of shaft 10 but also provides means whereby the tolerances between the inside or outside diameters need not be precise since the diameter of the sleeve 15 tends to expand under action of the lug 11 during driving operation and thus insure a tight fit. When in use, shaft 10 would ordinarily be the driving shaft and connected to the gear box of a silo unloader or the like and shaft 12 would be the driven shaft and supporting the helical collecting flighting. Initial rotation of shaft 10 in either direction would cause it to engage, through lug 11, either edge 22 or 23 of the slot 16, thus distorting or twisting the member 15 to provide a tight fit and supplying rotative force to member 12, but providing for initial give or absorption because of the resiliency of sleeve or member 15 and the spreading action allowed to be provided by the slot 16 in the axial spacing of the wells 20 and 21 with relation to the key 11.

Sleeve 15 should be of resilient material, preferably of steel which may be welded to the member 12. Members 10 and 12 are usually steel shafting and steel pipe respectively. While member 10 has been designated as the drive shaft and member 12 as a driven shaft, it will be appreciated that this may be reversed if desired.

What is claimed is:

1. A coupling assembly comprising in combination a hollow shaft, an elongated concentric resilient connecting member positioned interior thereof adjacent one end, the outer periphery of said concentric connecting member secured at spaced intervals to the inner periphery of said hollow shaft, said connecting member likewise being hollow, a second concentric shaft positioned interior of said elongated connecting member and engaging the same in a location spaced both axially and radially from the connections of said elongated connecting member to said first shaft.

2. A coupling assembly comprising in combination a drive shaft of given diameter, an extending lug means positioned adjacent one end thereof, a connecting sleeve having one end positioned to fit around the end of said drive shaft and the other end extending away from the drive shaft, a longitudinal slot in said connecting sleeve, the extending lug means of said drive shaft engaging said slot, a driven hollow shaft, said driven shaft being concentric with and positioned over said connecting sleeve, said driven shaft being provided with a plurality of opposed apertures and secured to said sleeve thereat to provide a plurality of connections, said connections being axially spaced away from the engagement of said lug means with the slot in said sleeve and perpendicular to a radial line drawn between the center of said sleeve and the center of said slot.

3. A coupling assembly comprising in combination a first hollow shaft, an elongated concentric tubular resilient connecting member positioned interior of and adjacent one end thereof, the outer periphery of said concentric connecting member connected at radially spaced intervals to the inner periphery of said hollow shaft, said connecting member having a slot extending the length thereof, a second concentric shaft having an end positioned interior of said elongated connecting member and having connection means engaging said slot in a location spaced axially from the connections of said elongated connecting member to said first shaft.

4. A coupling assembly comprising in combination a first hollow shaft, an elongated concentric resilient connecting member positioned substantially interior thereof and adjacent one end, the outer periphery of said concentric connecting member connected at radially spaced intervals at its interior end to the inner periphery of said hollow shaft, said connecting member likewise being hollow, a second concentric shaft having an end positioned interior of said elongated connecting member and having means for connecting it to the same at its outer end, and said second shaft extending in prolongation of said first shaft.

5. A coupling assembly comprising in combination a shaft, an elongated concentric tubular resilient connecting member positioned exterior thereof, the inner periphery of said concentric connecting member connected to the outer periphery of said shaft by extending lug means, said connecting member having a slot extending the length thereof, another shaft having connection means engaging said connecting member in a location spaced axially from the connection of said elongated connecting member to said previously mentioned shaft.

References Cited in the file of this patent

UNITED STATES PATENTS

| | | |
|---|---|---|
| 976,232 | Tyson | Nov. 22, 1910 |
| 1,841,255 | Rybeck | Jan. 12, 1932 |
| 1,935,683 | Wemp | Nov. 21, 1933 |
| 1,978,922 | Wemp | Oct. 30, 1934 |
| 2,229,657 | Larason | Jan. 28, 1941 |